United States Patent
Sheynblat

(10) Patent No.: US 9,151,821 B2
(45) Date of Patent: Oct. 6, 2015

(54) WATERMARKING ANTENNA BEAMS FOR POSITION DETERMINATION

(75) Inventor: Leonid Sheynblat, Hillsborough, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 489 days.

(21) Appl. No.: 12/509,352

(22) Filed: Jul. 24, 2009

(65) Prior Publication Data

US 2011/0021208 A1     Jan. 27, 2011

(51) Int. Cl.
*H04W 24/00*     (2009.01)
*G01S 5/02*      (2010.01)

(52) U.S. Cl.
CPC .................. *G01S 5/0205* (2013.01)

(58) Field of Classification Search
CPC ............ H04M 1/6075; H04M 1/6091; H04M 2203/256; H04M 1/66; H04M 3/2227
See application file for complete search history.

(56) References Cited

U.S. PATENT DOCUMENTS

| | | | |
|---|---|---|---|
| 4,949,268 A | 8/1990 | Nishikawa et al. | |
| 5,943,014 A | 8/1999 | Gilhousen | |
| 6,195,045 B1 | 2/2001 | Xu et al. | |
| 6,195,046 B1 * | 2/2001 | Gilhousen | 342/457 |
| 6,466,164 B1 * | 10/2002 | Akopian et al. | 342/357.63 |
| 6,714,525 B1 | 3/2004 | Mansour | |
| 7,016,688 B2 | 3/2006 | Simic et al. | |
| 7,139,580 B2 | 11/2006 | Stein et al. | |
| 2001/0016504 A1 * | 8/2001 | Dam et al. | 455/562 |
| 2004/0132488 A1 * | 7/2004 | Hidehiro et al. | 455/552.1 |
| 2004/0165657 A1 | 8/2004 | Simic et al. | |
| 2004/0166873 A1 * | 8/2004 | Simic et al. | 455/456.1 |
| 2006/0030262 A1 | 2/2006 | Anderson et al. | |
| 2007/0270190 A1 * | 11/2007 | Hisky et al. | 455/570 |
| 2007/0298761 A1 * | 12/2007 | Bani Hani | 455/404.2 |
| 2013/0021200 A1 * | 1/2013 | Brosius et al. | 342/357.46 |

FOREIGN PATENT DOCUMENTS

| | | |
|---|---|---|
| CN | 101268491 A | 9/2008 |
| CN | 101447005 A | 6/2009 |
| JP | 2000511369 A | 8/2000 |
| JP | 2000512101 A | 9/2000 |
| JP | 2002186018 A | 6/2002 |
| JP | 2006518977 A | 8/2006 |
| TW | 200804857 A | 1/2008 |
| WO | WO-9746034 A1 | 12/1997 |
| WO | WO2005048610 | 5/2005 |

OTHER PUBLICATIONS

International Search Report and Written Opinion—PCT/US2010/042946, International Search Authority—European Patent Office—Dec. 2, 2010.
Taiwan Search Report—TW099124563—TIPO—Mar. 30, 2013.

* cited by examiner

*Primary Examiner* — Keith Fang

(57) ABSTRACT

An antenna array may stagger the signal of one or more beams within a single base station sector. The time-delayed beams may have a watermark within the signal they are carrying. The receiving unit then may identify the beam as a time-delayed beam and compensate for the delay using stored data. The receiving unit may transmit the beam identification information to the base station and receive the time delay data.

14 Claims, 4 Drawing Sheets

WATERMARKING ANTENNA BEAMS FOR POSITION DETERMINATION

BACKGROUND

1. Field of the Invention

The present disclosure relates generally to communication, and more specifically to techniques for supporting positioning.

2. Description of Related Art

Wireless communication networks are widely deployed to provide various communication services, such as voice, video, packet data, messaging, broadcast, etc. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal FDMA (OFDMA) networks.

It is often desirable, and sometimes necessary, to know the location of a terminal in a wireless network. The terms "location" and "position" are synonymous and are used interchangeably herein. For example, a user may utilize the terminal to browse websites and may click on location sensitive content. The location of the terminal may then be determined and used to provide appropriate content to the user. There are many other scenarios in which knowledge of the location of the terminal is useful or necessary.

Various positioning methods may be used to determine the location of a terminal. Each positioning method may use certain information and may require certain capabilities at the terminal and/or a location server in order to compute a location estimate for the terminal. It is desirable to support positioning in an efficient manner in order to conserve resources and reduce delay.

SUMMARY

Techniques to support positioning for terminals are described herein. Positioning refers to a process to measure/compute a geographic location estimate of a target device. A location estimate may also be referred to as a position estimate, a position fix, etc. Positioning may be supported with a variety of location architectures/solutions.

In an aspect, an antenna array may stagger the signal of one or more beams within a single base station sector. The time-delayed beam(s) may have a watermark within the signal they are carrying. The receiving unit then may identify the beam as a time-delayed beam and compensate for the delay.

Various aspects and features of the disclosure are described in further detail below.

DETAILED DESCRIPTION

As noted above, the ability to determine the location of a mobile device can be beneficial, or even necessary. A number of positioning techniques are currently available. However, under some circumstances, obtaining a location with sufficient accuracy can be challenging.

A number of positioning techniques include measurements based on signals from network infrastructure such as wireless access points, base stations, etc. Examples include Advanced Forward Link Trilateration (AFLT), Enhanced Observed Time Difference (E-OTD), and Observed Time Difference Of Arrival (OTDOA), and may be referred to more generally as terrestrial range-based techniques. Additionally, hybrid positioning techniques may be used that include some terrestrial measurements (e.g., hybrid combinations of GPS and AFLT).

Some network infrastructure may include smart antenna architecture, where signals are broadcast on different antennas of the network infrastructure device, and where the network infrastructure device introduces a pre-determined delay in one or more of the broadcast signals. The introduced delay adds a delay to a time of arrival measurement at the mobile device, which could lead to inaccurate position data if the time of arrival measurement were used without knowledge of the delay. In some implementations, multiple beams of a base station may each have different pre-determined delays, which can further complicate the situation. Systems and techniques herein provide for more accurate and reliable position estimates, even when smart antenna systems are implemented.

Figure 1:
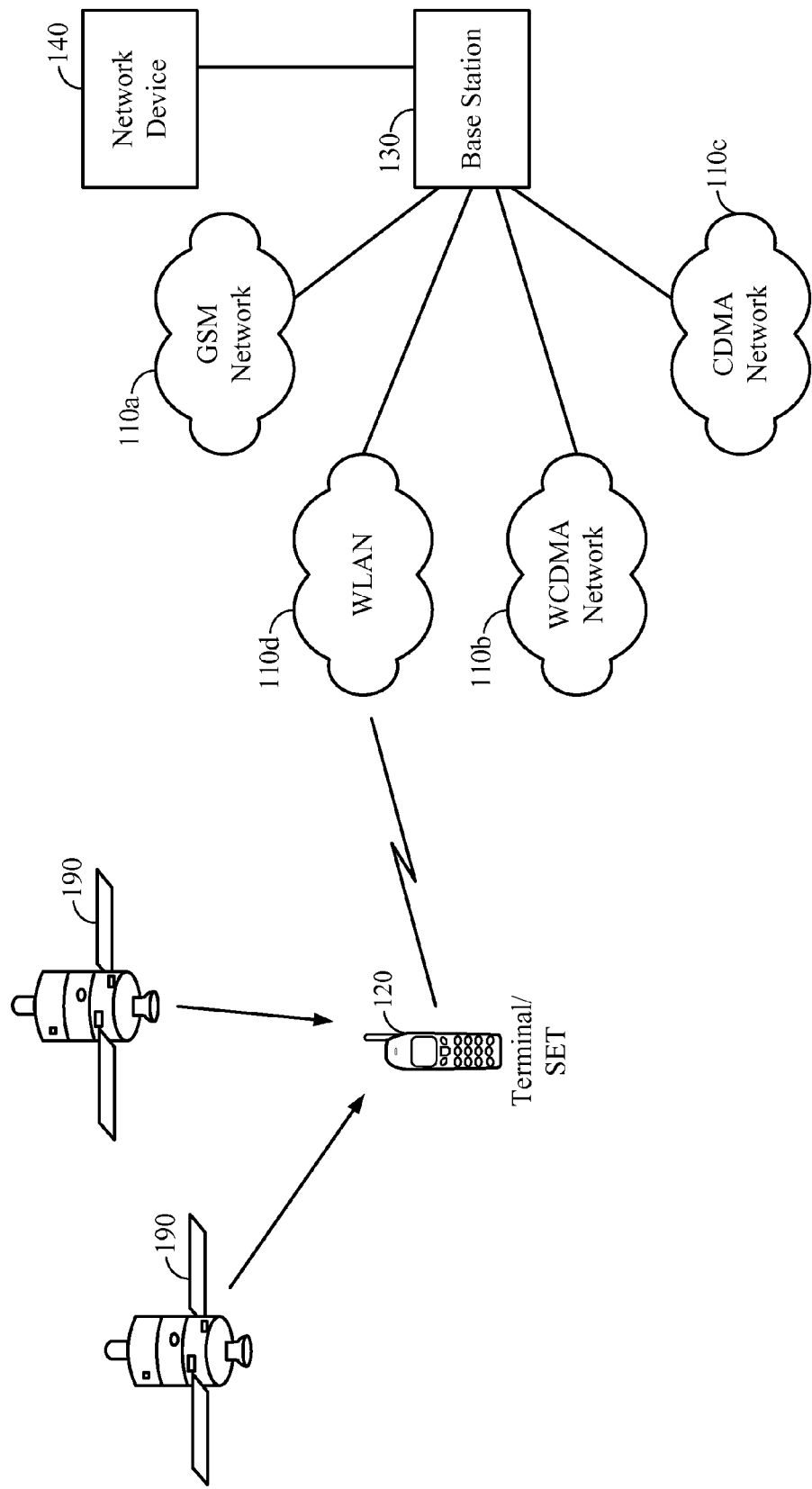
FIG. 1 shows a deployment of different radio access networks.

FIG. 1 shows an environment in which the current systems and techniques may be implemented. FIG. 1 shows an example deployment of different radio access networks (RANs), which include a Global System for Mobile Communications (GSM) network 110a, a Wideband Code Division Multiple Access (WCDMA) network 110b, a Code Division Multiple Access (CDMA) network 110c, and a Wireless Local Area Network (WLAN) 110d. A radio access network supports radio communication for terminals and may be all or part of a Wireless Wide Area Network (WWAN), a Wireless Metropolitan Area Network (WMAN), or a WLAN. For example, a WWAN may include a radio access network, a core network, and/or other networks, and only the radio access network portion is shown in FIG. 1 for simplicity. A radio access network may also be referred to as a radio network, an access network, etc. GSM network 110a, WCDMA network 110b, and CDMA network 110c may each include any number of base stations that support radio communication for terminals within their coverage areas. WLAN 110d may include any number of access points (WLAN APs) that support radio communication for terminals associated with these access points.

A terminal such as mobile device 120 may communicate with GSM network 110a, WCDMA network 110b, CDMA network 110c, and/or WLAN 110d at any given moment to obtain communication services, data services, and/or other services. The mobile device 120 may also simply receive signals from these networks in order to make measurements or obtain information useful in computing its location (e.g., mobile device 120 may communicate using WCDMA network 110b but use signals from WLAN 110d for positioning). The mobile device 120 may be referred to as a mobile station, a user equipment, a subscriber station, a station, etc. A terminal may be a cellular phone, a personal digital assistant (PDA), a handheld device, a wireless device, a laptop computer, a wireless modem, a cordless phone, a telemetry device, a tracking device, etc. Mobile device 120 may also be referred to as a SUPL Enabled Terminal (SET) in SUPL.

The mobile device 120 may receive and measure signals from satellites 190 to obtain pseudo-range measurements for the satellites. Satellites 190 may be part of the United States Global Positioning System (GPS), the European Galileo system, the Russian GLONASS system, or some other satellite positioning system (SPS). Mobile device 120 may also receive and measure signals from network infrastructure such as access points in WLAN 110d and/or base stations in radio access networks 110a, 110b and/or 110c to obtain timing and/or signal strength measurements for the network infrastructure. Mobile device 120 may communicate with one radio access network and may, at the same time or an earlier time, receive and measure signals from access points and/or base stations in other radio access networks to obtain measurements for these other access points and/or base stations. The measurements for satellites 190 and/or the measurements for the access points and/or base stations may be used to determine the location of mobile device 120.

A base station 130 may communicate with a mobile device 120 to support location services and/or positioning for the mobile device. The communication between base station 130 and mobile device 120 may be via any one of radio access networks 10a through 110d and/or via other networks. Mobile device 120 may support one or more positioning methods. For example, mobile device 120 may include receiver circuitry to receive and process satellite signals, may include circuitry to receive and process terrestrial signals, etc.

One or more network devices 140 may provide assistance for positioning techniques. For example, one or more network devices 140 may receive information associated with a coarse position estimate for mobile device 120 (such as the identification of a serving cell/cell sector), and provide assistance information to mobile device 120 to improve positioning. Additionally, one or more network devices 140 may receive pseudorange information, terrestrial positioning information, or other information from mobile device 120, and perform positioning calculations using the information.

Figure 2:
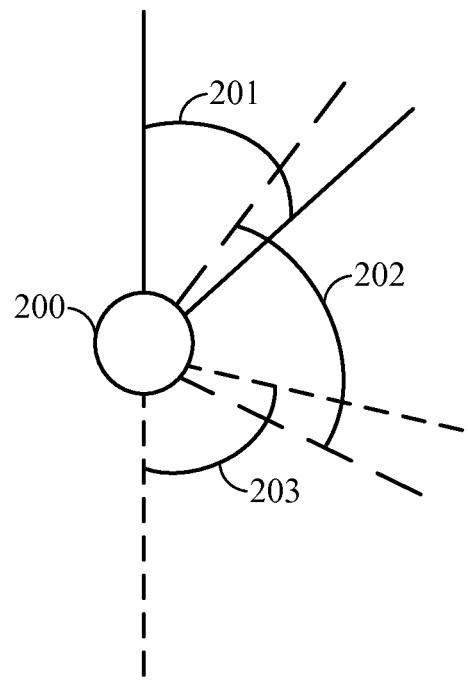
FIG. 2 illustrates a base station with multiple beams coming from an antenna array.

FIG. 2 illustrates an example wherein a base station 200 using an antenna array beams three signals 201, 202, 203 from three different antennas. In this example, the three signals 201, 202, 203 are somewhat overlapping in geographic coverage. One or more of the three signals 201, 202, 203 may be time delayed (time dithered). This may be done for reasons related to the better functioning of the antenna array, or due to hardware restrictions, or for other reasons. In some aspects, the three signals may differ with regard to phase, frequency, or another parameter.

Figure 3:
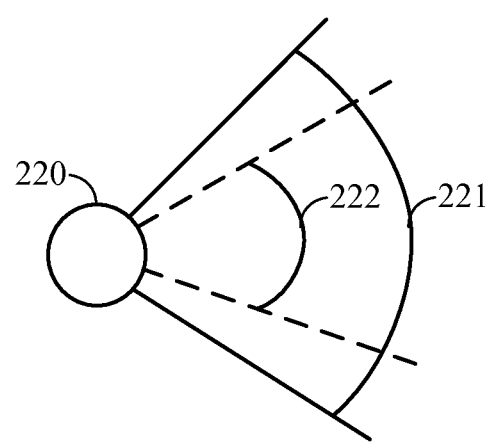
FIG. 3 illustrates a base station with overlaid beams coming from an antenna array.

FIG. 3 illustrates a base station 220 which transmits a first signal 221 and a second signal 222 which overlap substantially in geographic coverage. Circuitry in base station 220 may introduce a pre-determined time delay into one or both of the two signals 221, 222. The amount of pre-determined time delay may be different for signals 221 and 222. As noted above, delay may be introduced for reasons related to the better functioning of the antenna array, or due to hardware restrictions, or for other reasons. In some aspects, signals 221 and 222 may differ with regard to one or more of phase, frequency, or another parameter.

In the case of an antenna array with one or more signals that are time delayed, the delay may effect with the accuracy of a positioning measurement. However, this inaccuracy can be addressed by identifying the individual signal source, and accessing delay information associated with the particular signal source.

A watermark identifier may be used to address the effect the delay in a given signal has on positioning measurement accuracy. In some embodiments, the watermark may be implemented as a frequency modulated signature on signals transmitted by the particular antenna of the network infrastructure to the mobile device (on the forward link).

In one aspect, the watermark identifier may contain any type of data that may facilitate the processing of the signal received by the mobile device. For example, the watermark identifier may include key pieces of information, such as the delay time introduced into the signal beamed from a particular antenna in an array. Alternatively, the watermark identifier may simply identify the signal, which in turn identifies which antenna the signal was beamed from. The receiver of the signal may then retrieve data associated with the signal to perform delay compensation for the signal. At least some of the data may be stored in the memory of the mobile device, at a network infrastructure device, or a combination.

In one aspect, the watermark identifier identifies at least one property or parameter of the beamed signal. The mobile device can decode the signal in order to account for the effects introduced by the signal. For example, the watermark may identify a delay time associated with the beamed signal so that the mobile device can compensate for the delay time.

Figure 4:
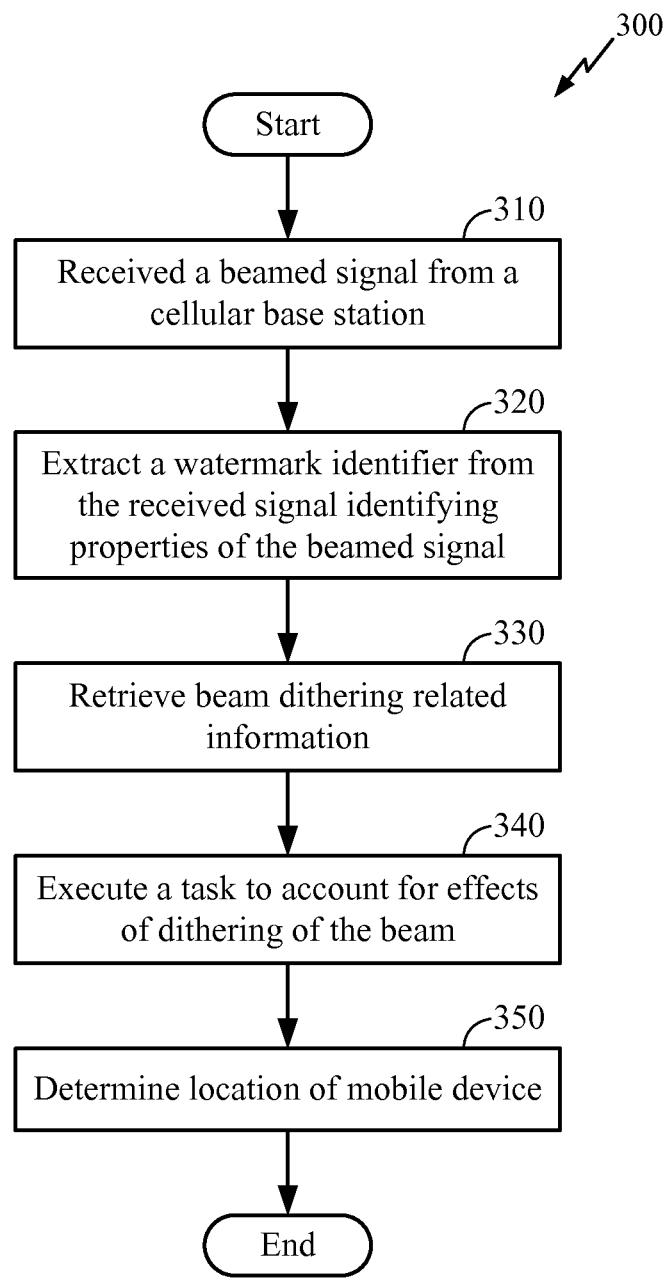
FIG. 4 is a flow chart for performing positioning tasks using a watermarked signal.

FIG. 4 illustrates a design of a process 300 utilizing a watermark to identify a beamed signal. The mobile device receives a beamed signal from a base station at 310. The mobile device may obtain cell and other information for the radio access network with which mobile device is communicating. The mobile device then processes the received signal to extract a watermark identifier from the received signal identifying properties of the beamed signal at 320. The identifier identifies the beam from which the signal is received. In some aspects, the identified beam will be one of many beams from the same base station, as in the case of a base station with an antenna array.

Another step in the process is to retrieve information related to the specific beam at 330, if needed. In some aspects, the mobile device will search the data received from the signal to determine if there is a watermark identifier indicating that there is beam related information. In some aspects, the signal may contain data containing the information for the beam, such as the time delay, phase shift, or other information. In some aspects, the mobile device will contain beam information within in it in a database such as an almanac, and will be able to retrieve the beam information based upon the identification of the beam. In some aspects, the mobile device will identify the beam, and then communicate with the network to retrieve beam information from the network.

After the mobile device has retrieved the beam dithering related information, the mobile device can execute a task accounting for the effects of the dithered beam at 340. In general, terrestrial positioning measurements determine the difference between the transmission time of a particular signal and the time at which it is received at the mobile device. The difference is indicative of the distance between the transmitter and receiver. However, when the signal is delayed before transmission, its apparent transmission time is before its actual transmission time, which would indicate that the distance between the transmitter and mobile device is greater than the true distance. In order to correct for this inaccuracy, the delay can be characterized and then subtracted to improve the position estimate.

The implementation of the correction depends on the particular communication system. In an implementation in which a time between transmission of the signal and time of arrival at the base station is determined using the pilot phase, the delay can be subtracted from the determined phase to account for the introduction of the delay. Many different implementations are possible; information indicative of the time of receipt, the time of transmission, the difference, or a combination can be modified to account for the delay in the signal.

In some aspects, the mobile device may utilize the network interactively when executing a task accounting for the effects of the dithered beam. In some aspects, the task execution takes place within the mobile device.

A position measurement can then be calculated using the information that takes into account the effects of dithering the beam at 350. In some aspects, the mobile device may utilize the network interactively when making the position measurement. In some aspects, the position measurement takes place within the mobile device. Once completed, the position measurement will be more accurate than a position measurement determined without taking the dithering effects into account.

In an example MS-assisted position location implementation, the mobile device may transmit received signal information (such as the extracted watermark identifier that identifies the particular transmitting antenna in an array at a base station, base station identification information, and/or time of arrival information) to a network resource such as a position determination entity (PDE). The network resource may determine a delay amount for the antenna associated with the particular watermark; for example, by accessing information in a base station almanac (BSA). The network resource may perform further position calculations using the delay amount for the antenna. For example, the network resource may use trilateration techniques to determine position information for the mobile device by modifying the time of arrival information using the delay information, then combining the results with other measurements (e.g., measurements indicative of a distance between the mobile device and other network infrastructure devices and/or satellites).

In other implementations, the mobile device itself may do more of the processing. For example, the mobile device may query a network resource for information about the delay associated with a particular antenna, then use the delay information to determine a pseudorange between the antenna and the device, or may even determine its position (usually using a number of measurements).

The apparatus used to implement the above techniques may include a number of features. For example, a mobile device such as terminal 120 of FIG. 1 may include memory and processor modules to implement the above techniques. For example, the mobile device may be configured to store beam information. The beam information can include (for example) serving cell identities with associated beam indication, channel information such as frequency, code, and/or timing, received signal strength or service quality and neighboring cell measurements. The mobile device may also include hardware, software, firmware, or a combination to implement techniques described above. For example, the mobile device may be configured to format and transmit beam identification information.

Similarly, a network device or devices can use the beam identification information to provide more accurate approximate position information for the mobile device. For example, a network system (which may include one or more servers) may receive beam identification information and determine more accurate approximate position information therefrom.

Figure 5:
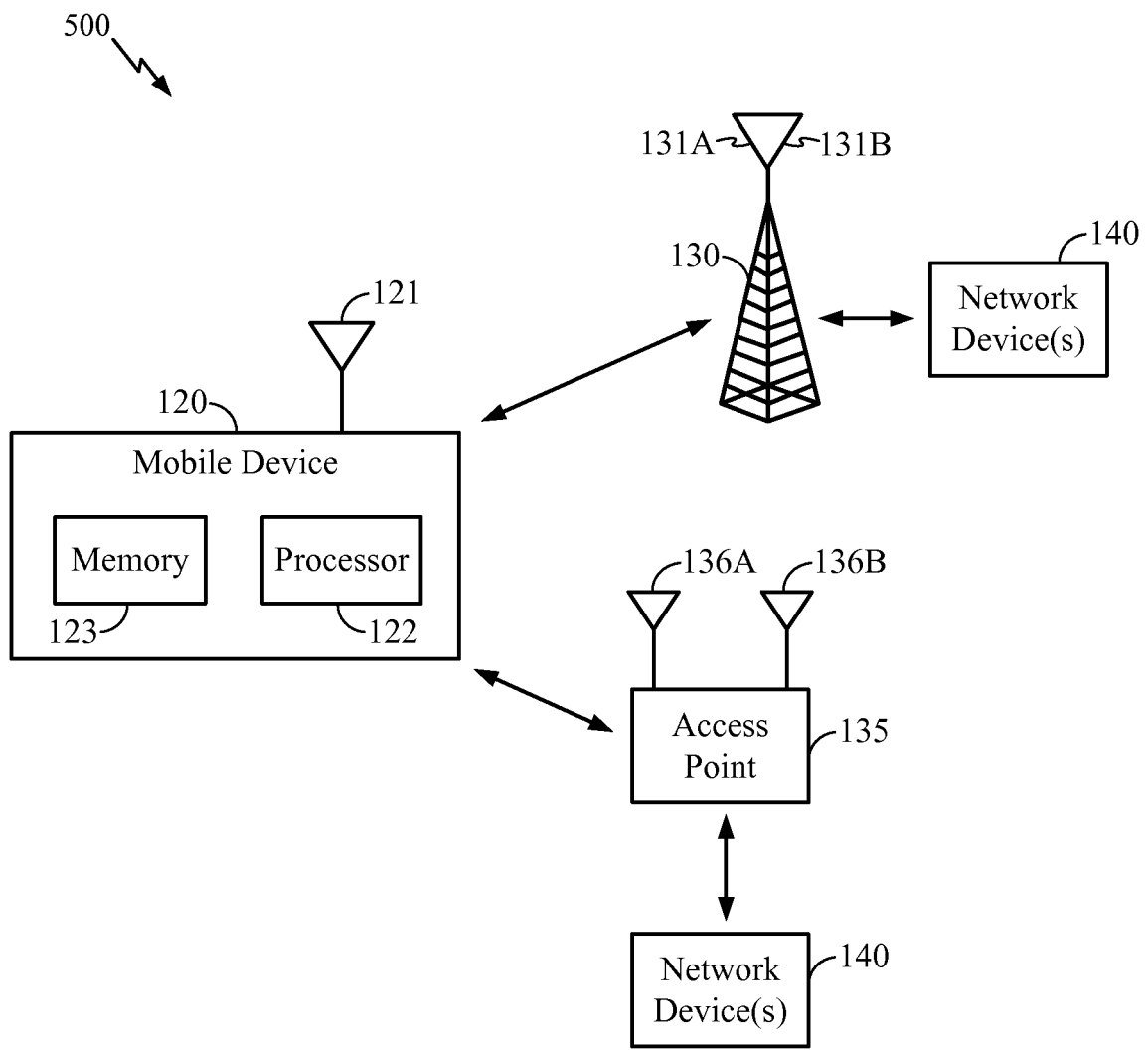
FIG. 5 shows a communication environment to implement aspects of the current disclosure.

FIG. 5 shows an example communication environment 500 in which the current techniques may be used. A mobile device 120 includes one or more antennae 121 to receive signals. In some embodiments, mobile device 120 may include antennae to receive satellite signals, signals from cellular base stations, signals from wireless access points (which may be WLAN access points, Bluetooth devices, or other wireless devices configured to communicate with other devices). Mobile device 120 includes a processor 122 and memory 123 to implement the techniques of the current disclosure; however, mobile device 120 may also include many other types of circuitry such as signal processing and conditioning circuitry for communication, data processing, location techniques, etc. The additional circuitry is not shown here, for simplicity.

Environment 500 includes devices such as a base station 130 with multiple antenna elements 131A and 131B, where an antenna element refers to an antenna or a portion of an antenna configured to transmit a particular signal. Signals transmitted by either element 131A, element 131B, or both include information that identifies the antenna element. Base station 130 may be in communication with network device(s) 140, which may provide information and/or processing resources for the disclosed techniques. As noted in previous sections, the network device(s) may include almanac information that associates a particular watermark with characteristics of the antenna using that watermark. The characteristics of the antenna using the watermark can then be used in a positioning process.

Environment 500 further includes an access point 135 including a first antenna 136A and a second antenna 136B, where signals transmitted by either first antenna 136A, second antenna 136B or both include information that identifies the antenna. Access point 135 may be in communication with network device(s) 140, as noted above with respect to base station 130. Note that many configurations may be used; for example, a mobile device 120 in communication with both base station 130 and access point 135 may receive information and/or processing assistance from network device(s) 140 associated with base station 130 and may not receive information and/or processing assistance from any network resource associated with access point 135. In another example, network assistance may be available from both base station 130 and access point 135, but the network devices 140 may in some case be totally separate.

For an example where mobile device 120 is in communication with a base station 130 having antenna elements 131A and 131B, mobile device 120 may receive signals from both antenna elements 131A and 131B (either concurrently or at different times). The signals may be processed using processor 122 to determine watermark identification information associated with either antenna element 131A, 131B, or both. Mobile device 120 may provide position information indicative of the position of mobile device 120 that is determined using the first signal or the second signal or both. For example, the received signal may be processed and the first signal identified by its watermark. Once the identity of the transmitting antenna element has been ascertained, characteristics of that antenna (such as dithering information) can be used in a positioning technique. On-device processing for mobile device 120 may be accomplished using processor 122 (which can be implemented as a single element or can encompass processing resources from multiple elements, which can include general processing circuitry and/or circuitry designed for specific processing requirements of the implemented techniques). Memory 123 can store software instructions (e.g., instructions to determine watermark information included with received signals) and/or data (such as almanac data associating watermark information with characteristics of the particular antenna having that watermark).

The above positioning techniques may be used in a number of network environments. Techniques for supporting positioning in wireless networks are described herein. The techniques may be used for various wireless networks such as wireless wide area networks (WWANs), wireless metropolitan area networks (WMANs), wireless local area networks (WLANs), broadcast networks, etc. The terms "network" and "system" are often used interchangeably.

A WWAN is a wireless network that provides communication coverage for a large geographic area such as, e.g., a city, a state, or an entire country. A WWAN may be a cellular network such as a CDMA network, a TDMA network, an FDMA network, an OFDMA network, etc. A CDMA network may implement a radio technology such as Wideband CDMA (WCDMA), cdma2000, Time Division-Synchronous Code Division Multiple Access (TD-SCDMA), etc. cdma2000 covers IS-2000, IS-95, and IS-856 standards. A TDMA network may implement a radio technology such as Global System for Mobile Communications (GSM). An OFDMA network may implement a radio technology such as Ultra Mobile Broadband (UMB), Long Term Evolution (LTE), Flash-OFDM®, etc. These various radio technologies and standards are known in the art. WCDMA, GSM and LTE are described in documents from an organization named "3rd Generation Partnership Project" (3GPP). CDMA and UMB are described in documents from an organization named "3rd Generation Partnership Project 2" (3GPP2). 3GPP and 3GPP2 documents are publicly available.

A WLAN is a wireless network that provides communication coverage for a small or medium geographic area such as, e.g., a building, a shop, a mall, a home, etc. A WLAN may implement a radio technology such as any defined by IEEE 802.11, Hiperlan, etc. A WMAN may implement a radio technology such as any defined by IEEE 802.16. IEEE 802.11 and 802.16 are two families of standards from The Institute of Electrical and Electronics Engineers (IEEE). The IEEE 802.11 family includes 802.11a, 802.11b, 802.11g and 802.11n standards and is commonly referred to as Wi-Fi. The IEEE 802.16 family includes 802.16e and 802.16m standards and is commonly referred to as WiMAX.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory and executed by a processor. The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for determining the position of a mobile device, said method comprising:

in the mobile device, receiving a first signal from a first antenna element of a first base station and a second signal from a second antenna element of the first base station, wherein the first base station includes a first antenna array having at least the first antenna element and the second antenna element, and the first signal from the first antenna element and the second signal from the second antenna element have an overlapping geographical coverage;

receiving a third signal from a third antenna element of a second base station, wherein the second base station includes a second antenna array having at least the third antenna element and a fourth antenna element;

processing the first signal to determine first watermark identification information indicative of the first antenna element, the first watermark information identifying a time delay introduced into signals transmitted by the first antenna element;

processing the third signal to determine third watermark identification information indicative of the third antenna element, the third watermark information identifying a time delay introduced into signals transmitted by the third antenna element;

access information indicative of one or more characteristics of the first antenna using the determined watermark information associated with the first antenna;

receive the information indicative of the one or more characteristics of the first antenna in a communication and store the information in a memory, the memory further storing information indicative of characteristics of a plurality of antennas associated with watermark information for each of the plurality of antennas;

determine pseudorange information indicative of a distance from the first antenna to the mobile device using the information indicative of the one or more characteristics of the first antenna; and providing position information indicative of the position of the mobile device, wherein the position information is determined using at least the first signal and the third signal and using the pseudorange information.

2. The method of claim 1 wherein said first watermark identification information identifies at least one property of the first signal of the first antenna element.

3. The method of claim 1 wherein providing position information indicative of the position of the mobile device comprises receiving position information over a network interface and storing the position information.

4. The method of claim 2 further comprising accessing at least one property of the first signal.

5. The method of claim 1 further comprising processing the second signal to determine second different watermark identification information indicative of the second antenna element.

6. The method of claim 1, wherein the first base station is associated with a Global System for Mobile Communications (GSM) network, a Wideband Code Division Multiple Access (WCDMA) network, or a Code Division Multiple Access (CDMA) network, and wherein the second base station is a Wireless Local Area Network (WLAN).

7. The method of claim 1, further comprising querying a network device configured to provide assistance for positioning techniques, wherein the network device configured to provide assistance for positioning techniques includes almanac information that associates the first watermark identification information with beam information.

8. The method of claim 1, wherein the processing the first signal to determine first watermark identification information indicative of the first antenna element comprises:
   extracting the first watermark identification information from the first signal;
   retrieving beam dithering related information using the first watermark identification information; and
   executing a task to account for effects of the beam dithering related information.

9. A mobile device comprising:
   an antenna capable of receiving a first signal from a first antenna element of a first base station and a second signal from a second antenna element of the first base station, wherein the first base station includes a first antenna array having at least the first antenna element and the second antenna element, and the first signal from the first antenna element and the second signal from the second antenna element have an overlapping geographical coverage, as well as receiving a third signal from a third antenna element of a second base station, wherein the second base station includes a second antenna array having at least the third antenna element and a fourth antenna element;
   a memory to store information indicative of characteristics of a plurality of antennas associated with watermark information for each of the plurality of antennas;
   processor circuitry configured to:
      process the first signal to determine first watermark identification information indicative of the first antenna element, the first watermark information identifying a time delay introduced into signals transmitted by the first antenna element;
      process the third signal to determine third watermark identification information indicative of the third antenna element, the third watermark information identifying a time delay introduced into signals transmitted by the third antenna element;
      access the information indicative of one or more characteristics of the first antenna using the determined watermark information associated with the first antenna;
      receive the information indicative of the one or more characteristics of the first antenna in a communication and store the information in the memory:,
      determine pseudorange information indicative of a distance from the first antenna to the mobile device using the information indicative of the one or more characteristics of the first antenna; and
      provide position information indicative of the position of the mobile device, wherein the position information is determined using at least the first signal and the third signal and using the pseudorange information.

10. A non-transitory computer-readable storage medium, having stored thereon computer-readable instructions for determining the position of a mobile device, comprising instructions configured to cause a computer to:
   process a first signal to determine first watermark identification information indicative of a first antenna element of a first base station, the first watermark information identifying a time delay introduced into signals transmitted by the first antenna element, wherein the first base station includes a first antenna array having at least the first antenna element and a second antenna element, and wherein the first signal from the first antenna element and a second signal from the second antenna element have an overlapping geographical coverage;
   process a third signal to determine third watermark identification information indicative of a third antenna element of a second base station, wherein the second base station includes a second antenna array having at least the third antenna element and a fourth antenna element, the third watermark information identifying a time delay introduced into signals transmitted by the third antenna element;
   access information indicative of one or more characteristics of the first antenna using the determined watermark information associated with the first antenna;
   receive the information indicative of the one or more characteristics of the first antenna in a communication and store the information in the memory, the memory also to store information indicative of characteristics of a plurality of antennas associated with watermark information for each of the plurality of antennas;
   determine pseudorange information indicative of a distance from the first antenna to the mobile device using the information indicative of the one or more characteristics of the first antenna; and
   provide position information, indicative of the position of the mobile device, wherein the position information is determined using at least the first signal and the third signal and using the pseudorange information.

11. The medium of claim 10 wherein said first watermark identification information identifies at least one property of the first signal of the first antenna element.

12. The medium of claim 10 further comprising instructions configured to cause the computer to access at least one property of the first signal.

13. The medium of claim 10 further comprising instructions to cause the computer to process the second signal to determine second different watermark identification information indicative of the second antenna element.

14. The medium of claim 10 wherein the instructions to cause the computer to provide position information indicative of the position of the mobile device include instructions to cause the computer to receive position information over a network interface and to store the position information.

* * * * *